US012589361B2

(12) United States Patent

Isaacman-Vanwertz

(10) Patent No.: US 12,589,361 B2
(45) Date of Patent: Mar. 31, 2026

(54) APPARATUS FOR ENRICHING THE CONCENTRATION OF TRACE COMPONENTS IN AIR FLOW

(71) Applicant: VIRGINIA TECH INTELLECTUAL PROPERTIES, INC., Blacksburg, VA (US)

(72) Inventor: Gabriel Isaacman-Vanwertz, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 320 days.

(21) Appl. No.: 18/276,481

(22) PCT Filed: Feb. 22, 2022

(86) PCT No.: PCT/US2022/070760

§ 371 (c)(1),
(2) Date: Aug. 9, 2023

(87) PCT Pub. No.: WO2022/178556

PCT Pub. Date: Aug. 25, 2022

(65) Prior Publication Data

US 2024/0123410 A1 Apr. 18, 2024

Related U.S. Application Data

(60) Provisional application No. 63/152,043, filed on Feb. 22, 2021.

(51) Int. Cl.
*B01D 53/22* (2006.01)
*B01D 69/04* (2006.01)
(Continued)

(52) U.S. Cl.
CPC ........... *B01D 69/04* (2013.01); *B01D 53/228* (2013.01); *B01D 71/36* (2013.01);
(Continued)

(58) Field of Classification Search
CPC .. B01D 69/04; B01D 71/643; B01D 71/5222; B01D 53/228; B01D 71/36; B01D 71/68; B01D 2257/708
See application file for complete search history.

(56) References Cited

U.S. PATENT DOCUMENTS 3,438,241 A * 4/1969 Mckinley, Jr. ........... G01N 7/10
436/178
4,957,513 A * 9/1990 St. Hilaire ............. B01D 53/22
95/45
(Continued)

FOREIGN PATENT DOCUMENTS

EP 1148337 A2 * 10/2001 ......... G01N 33/0014

OTHER PUBLICATIONS

International Search Report and Written Opinion, PCT/US2022/070760, mailed May 3, 2022, pp. 1-15.

*Primary Examiner* — Anthony Shumate
(74) *Attorney, Agent, or Firm* — Thomas I Horstemeyer, LLP

(57) ABSTRACT

Various embodiments of a system and method for enriching a concentration of components of interest in an air flow are described. The system includes an apparatus for enriching a concentration of components of interest in an air flow. The apparatus includes a chamber and a tube having a tube wall made of a selectively permeable material positioned within the chamber. A first end of the tube is connected to the inlet port of the chamber and a second end of the tube is connected to the outlet port of the chamber. The selectively permeable material has a lower permeability to components of interest than to inert gases, and the selectively permeable (Continued)

material is non-reactive with components of interest. The apparatus is configured to receive a sample stream and the chamber is maintained at a chamber pressure that is different than a stream pressure of the sample stream.

20 Claims, 6 Drawing Sheets

(51) Int. Cl.

| | |
|---|---|
| *B01D 71/36* | (2006.01) |
| *B01D 71/52* | (2006.01) |
| *B01D 71/64* | (2006.01) |
| *B01D 71/68* | (2006.01) |

(52) U.S. Cl.
CPC ....... *B01D 71/5222* (2022.08); *B01D 71/643* (2022.08); *B01D 71/68* (2013.01); *B01D 2257/708* (2013.01)

(56) References Cited

U.S. PATENT DOCUMENTS

| | | | | |
|---|---|---|---|---|
| 5,012,052 | A * | 4/1991 | Hayes | G01N 30/84 |
| | | | | 250/288 |
| 5,753,009 | A | 5/1998 | Sirkar et al. | |
| 5,914,154 | A | 6/1999 | Nemser | |
| 7,166,148 | B2 * | 1/2007 | Lyons | B01D 67/009 |
| | | | | 427/407.1 |
| 8,513,593 | B2 * | 8/2013 | Quimby | H01J 49/0027 |
| | | | | 250/284 |
| 8,764,888 | B2 * | 7/2014 | Ophir | A61B 5/082 |
| | | | | 95/52 |
| 2003/0157403 | A1 * | 8/2003 | Shelekhin | H01M 6/46 |
| | | | | 429/162 |
| 2004/0177645 | A1 * | 9/2004 | Zhang | F25B 37/00 |
| | | | | 62/484 |
| 2008/0223787 | A1 * | 9/2008 | Dasgupta | G01N 30/96 |
| | | | | 210/198.3 |
| 2011/0266220 | A1 * | 11/2011 | Campos | B01D 71/76 |
| | | | | 585/818 |
| 2014/0197333 | A1 * | 7/2014 | Jolliffe | H01J 49/044 |
| | | | | 250/423 P |
| 2015/0122121 | A1 | 5/2015 | Mcgrath et al. | |
| 2020/0078729 | A1 * | 3/2020 | Huang | F23J 15/006 |
| 2022/0111330 | A1 * | 4/2022 | Seefeldt | A61M 16/101 |
| 2024/0207494 | A1 * | 6/2024 | Kopperschmidt | A61M 60/113 |

\* cited by examiner

APPARATUS FOR ENRICHING THE CONCENTRATION OF TRACE COMPONENTS IN AIR FLOW

CROSS REFERENCE TO RELATED APPLICATIONS

This application is the 35 U.S.C. § 371 national stage application of Patent Cooperation Treaty Application No. PCT/US2022/070760, filed Feb. 22, 2022, entitled "APPARATUS FOR ENRICHING THE CONCENTRATION OF TRACE COMPONENTS IN AN AIR FLOW," which application claims the benefit of and priority to U.S. Provisional Application No. 63/152,043, titled "APPARATUS FOR ENRICHING THE CONCENTRATION OF TRACE COMPONENTS IN AN AIR FLOW," filed on Feb. 22, 2021, the entire contents of both of which applications are hereby incorporated herein by reference.

BACKGROUND

There are thousands of different organic compounds in the atmosphere, carrying a wide range of impacts on air quality, radiative forcing, and human health. However, despite their significant impacts, the compounds are usually present in parts per thousand (ppt) to parts per billion (ppb) concentrations. Moreover, many of the most reactive compounds also have low volatilities and may get lost to instrument lines and surfaces. As a result, it is necessary to detect very low levels of reactive compounds to measure reactive gases. This has been particularly limiting for low-cost instrumentation, such as photoionization detectors, which are frequently limited to detection levels that are too high to be useful under typical ambient conditions.

Interest in low-cost sensors for air quality measurements has recently grown, both in consumer-grade electronics and by air quality researchers and regulators. A number of research-grade sensor packages are available for ~$5-20 k per package, but these generally do not include a low-cost sensor for volatile organic compounds (VOCs), as there is little confidence in the reliability of their measurements. A significant reason for this gap is that current low-cost VOC technologies, which were originally designed for high levels of potential workplace exposure, have levels of detection at or near typical ambient VOC concentrations and are not useful for monitoring or measuring ambient air quality.

SUMMARY

Systems and methods for enriching the concentration of trace components in an air flow are described. In one example, an apparatus for enriching a concentration of components of interest in an air flow can include a chamber having an inlet port and an outlet port and a tube having a tube wall made of a selectively permeable material positioned within the chamber. The tube has a length, with a first end of the tube connected to the inlet port of the chamber and a second end of the tube connected to the outlet port of the chamber. The selectively permeable material has a lower permeability to components of interest than to inert gases and the selectively permeable material being non-reactive with components of interest. The apparatus is configured to receive a sample stream and the chamber is maintained at a chamber pressure that is different than a stream pressure of the sample stream.

In some cases, the chamber pressure of the apparatus is less than the stream pressure of the sample stream. In some cases, the chamber is subjected to a vacuum outside the tube to set the chamber pressure, the sampling stream inside the tube is pressurized to set the stream pressure, or a combination of both. The selectively permeable material is configured to allow inert gases to pass through the selectively permeable material. In some cases, the selectively permeable material can include an amorphous glassy copolymer. In some cases, the selectively permeable material can include at least one of: polytetrafluoroethylene (PTFE), tetrafluoroethylene (TFE), polysulfone (PSU), polyethersulfone (PES) and polyphenylene sulfone (PPSU), polyetherimide (PEI), or polyether ether ketone (PEEK). In some cases, the selectively permeable material can be Teflon™ AF-2400. The tube has a wall thickness, and a permeation rate is inversely proportional to the wall thickness. An outlet concentration of the components of interest in an outlet flow is greater than an inlet concentration of components of interest in the sample stream received. The tube can be one of a plurality of tubes configured in parallel to receive the sample stream.

In another example, a system for enriching a concentration of components of interest in an air flow can include a concentrating apparatus, an analyte sensor configured to measure or detect the components of interest, and a pump configured to introduce a sample stream of air to the concentrating apparatus at a volumetric flow rate. The concentrating apparatus can include: a chamber that can include an inlet port and an outlet port and a tube having a tube wall made of a selectively permeable material positioned within the chamber. The tube has a length, where a first end of the tube is connected to the inlet port of the chamber and a second end of the tube is connected to the outlet port of the chamber. The selectively permeable material having a lower permeability to components of interest than to inert gases and the selectively permeable material being non-reactive with components of interest. The concentrating apparatus is configured to receive the sample stream and the chamber is maintained at a chamber pressure that is different than a stream pressure of the sample stream.

In another example, a method for enriching a concentration of trace components in an air flow is described. The method can include introducing a sample stream of air into a concentrating apparatus. The concentrating apparatus can include a chamber including an inlet port and an outlet port, and a tube made of a selectively permeable material. The tube has a length and a diameter, where a first end of the tube connected to the inlet port of the chamber and a second end of the tube connected to the outlet port of the chamber. The selectively permeable material having a lower permeability to components of interest than to inert gases and the selectively permeable material being non-reactive with the components of interest. The method also includes maintaining a chamber pressure of the chamber to be different than a stream pressure of the sample stream in the tube. The method also includes detecting a concentration of the components of interest.

In one case for the method, the chamber pressure is less than the stream pressure of the sample stream. The chamber is subjected to a vacuum outside the tube, the sampling stream inside the tube is pressurized, or a combination of both. The selectively permeable material is configured to allow inert gases to pass through the selectively permeable material. The chamber is subjected to a vacuum outside the tube, the sampling stream inside the tube is pressurized, or a combination of both. The selectively permeable material for the tube is selected based on the components of interest. The thickness and length of the tube are selected for a permeation rate.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Figure 1:
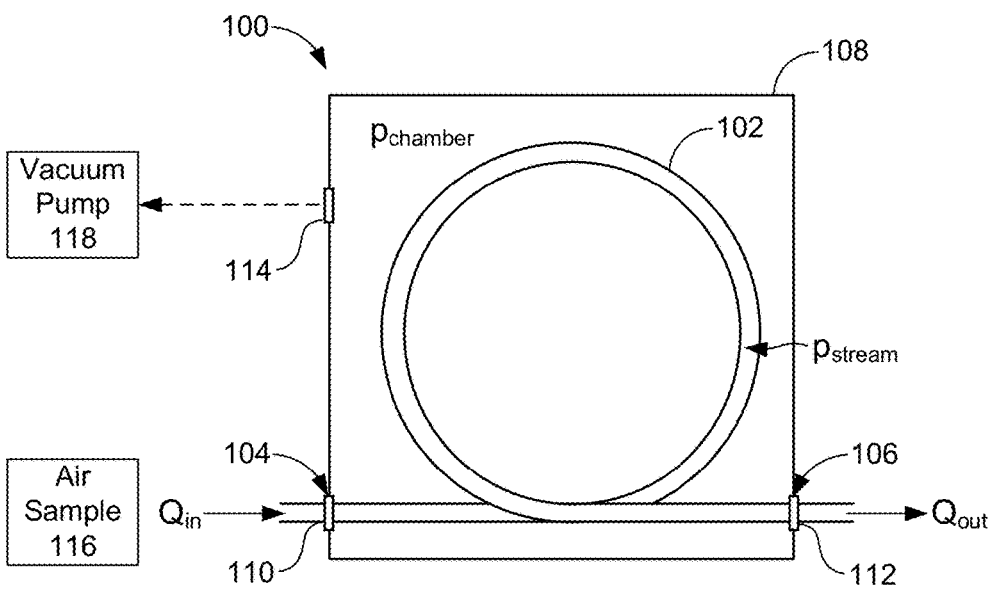
FIG. 1 illustrates an example schematic diagram of a concentrating inlet apparatus for enriching the concentration of trace components in an air flow according to various embodiments described herein.

Many sensors available for air quality measurements suffer from levels of detection that make them of only marginal use for typical ambient air conditions. The disclosed system for enriching the concentration of trace components in an air flow is designed to enrich volatile organic compounds (VOCs) in a sample air flow, with expected capabilities of increasing concentrations by a factor of 5-50× at a moderate cost, enabling current low-cost VOC technologies to be used for ambient air quality measurements. This is potentially of interest to all researchers and regulators interested in lower-cost measurements of air quality, particularly any users of current research-grade sensor packages.

The concepts described herein are directed to methods and systems for enriching the concentration of trace components in an air flow. A system for enriching the concentration of trace components in air flow includes a concentrating inlet that can concentrate reactive organic gases in sample flows, and consequently provide improved sensitivity and limits of detection. Inert gases, such as oxygen and nitrogen, are selectively removed from the sample stream, leaving organic or other trace gases concentrated into a smaller flow to the detector. Enrichment multiplied at about 1 standard cubic centimeter per minute (sccm) for major reactive atmospheric gases was demonstrated in testing. Among others, sampled components of interest can be monoterpenes ($C_{10}H_{16}$, such as α-pinene); sesquiterpenes ($C_{15}H_{24}$, such as β-caryophyllene); and n-alcohols (such as methanol and butanol). The relationships between inlet parameters, operating conditions, and inlet efficiency are also described and demonstrated. Enrichment relates to a concentration of the components of interest in an outlet flow compared to the concentration of components of interest in the inlet sample stream received. Enrichment by an order of magnitude or more is possible at sccm-level flows for a moderate cost using the concepts described herein.

Disclosed herein is a concentrating inlet apparatus based on differential permeability of inert components of air compared to trace components of interest that are ubiquitous in air at low parts per million (ppm) concentrations. For example, inert components of air can include oxygen and nitrogen, whereas trace components can be reactive gases. In an example, sampled ambient air can be passed through a long semi-permeable tube that is housed within a sheath or container maintained at a pressure below the sample flow. The sheath, container, or other chamber can be pressurized or under vacuum. The sample flow for concentrating can be controlled either by pulling with a pump (ambient pressure sample flow), or by compressing sampled air through a pump (high pressure sample flow).

The apparatus disclosed herein can be used for air quality measurements to provide improved levels of detection for typical ambient air conditions. Inert gases (nitrogen, oxygen) are pumped away from a sample air flow through a semi-permeable material, leaving a sample stream enriched in trace components. The concentrating inlet apparatus disclosed herein can be attached to the front-end of any measurement system and is inert, thus is ideal to enhance any measurements of reactive trace gases. The semi-permeable tube can be embodied as Teflon™/PEEK wetted surfaces in one case. In an example, the concentrating inlet apparatus is designed for low sample flows, on the order of a few sccm, but the technology is scalable to higher flows. Depending on operating conditions, sample flows, and target compounds of interest, concentrations of trace components in the sample flow can be increased by a factor of 5-50× at moderate costs and low flows (1 to 5 sccm). Cost scales with degree of enrichment and amount of sample flow, but there are no inherent limitations to either.

Atmospheric organic compounds are usually present in ppt to ppb concentrations with low volatilities and tend to get lost to instrument lines and surfaces during measurement. The concentrating inlet apparatus disclosed can concentrate organic gases in small sample flows (up to 5 sccm per flow pathway) to provide improved sensitivity and limits of detection. The semi-permeable material of the tube can be chosen for selective permeation to certain compounds in some cases. For example, Teflon™ AF-2400 is selectively permeable to certain compounds when subjected to a pressure differential across its walls. Under vacuum, pressurized conditions, or a combination of both, inert gases permeate out and leave a concentrated stream of sample in the tubing. For example, enrichment at ~1 sccm for major reactive atmospheric gases, such as monoterpenes and n-alcohols, can be demonstrated. The relationship between inlet design parameters, operating conditions, and inlet efficiency are shown, estimating that enrichment by an order of magnitude or more is possible at sccm-level flows. The apparatus disclosed herein provides a reliable method to measure low concentrations of highly volatile gases at ambient conditions.

Turning to the figures, FIG. 1 illustrates an example schematic diagram of a concentrating inlet apparatus 100. The concentrating inlet apparatus 100 can include a tube 102 having a first end 104 and a second end 106. The tube 102 can be made of a selectively permeable material and be contained within and attached to a chamber 108. The chamber 108 can include an inlet port 110 and an outlet port 112, where the first end 104 of the tube 102 is connected the inlet port 110 and a second end of the tube 106 is connected to the outlet port 112 of the chamber 108. In some examples, the tube 102 can extend through the inlet and outlet ports 110, 112 for continuous flow. Among other characteristics, the tube 102 can have a selected length (L) and a selected diameter (D). The tube 102 can be chosen in some cases to have a certain or selected permeability depending on various factors, including the compounds of interest to be concentrated, the desired speed of concentration, the pressures and pumping equipment available for use, and other factors.

The selectively permeable tube 102 can be made of a material of lower permeability to trace components of interest than to inert gases. The material of the tube 102 is non-reactive with components of interest. For example, a selectively permeable material for the tube 102 can be a glassy polymer, such as a polytetrafluoroethylene (PTFE), tetrafluoroethylene (TFE), polysulfone (PSU), polyethersulfone (PES) and polyphenylene sulfone (PPSU), polyetherimide (PEI), or polyether ether ketone (PEEK).

The chamber 108 can be made of a polymer, plastic, or other material that can withstand vacuum conditions. However, this does not need to be a high or hard vacuum, but a pressure lower than ambient atmospheric pressure. For example, if a vacuum pump 118 is used to evacuate the chamber 108 to lower the chamber pressure, the chamber can have a pressure of about 20 percent of ambient. However, a pressure stronger than 5-10 percent is probably unnecessary. In some examples, the chamber can be a container or canister having a volume. In some examples, the chamber can be a sheath about the tube 102.

As shown in FIG. 1, the concentrating inlet apparatus 100 is configured to receive a sample stream from an air sample 116 at an input flow rate ($Q_{in}$). The concentrating inlet apparatus 100 is also configured to discharge the air sample 116 at an output flow rate ($Q_{out}$). The chamber 108 can be configured to maintain a chamber pressure ($p_{chamber}$) below a pressure of the sample stream ($p_{stream}$). The chamber 108 can include an auxiliary port 114 that can be open for ambient air (high pressure testing conditions) or connected to the vacuum pump 118 (subambient testing conditions) to reduce the chamber pressure ($p_{chamber}$). For example, the chamber 108 can be subjected to a vacuum outside the tube 102, such that $p_{chamber} < p_{stream}$. In another example, the chamber 108 can be at ambient pressure outside the tube 102 and the air sample stream introduced into the tube 102 at a high pressure, such that $p_{chamber} < p_{stream}$. In another example, both the chamber 108 can be subjected to a vacuum outside the tube 102 and the air sample stream introduced into the tube 102 at a high pressure, such that $p_{chamber} < p_{stream}$.

Figure 2:
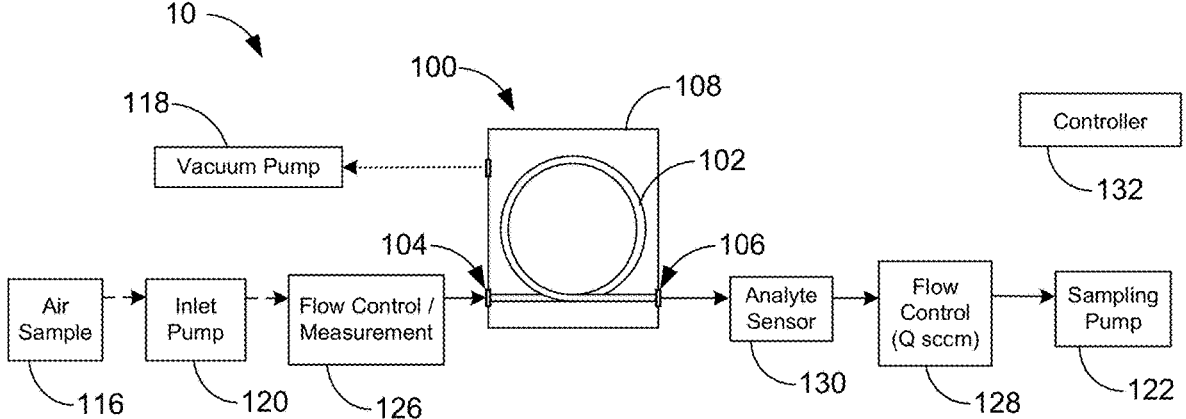
FIG. 2 illustrates a schematic diagram of an example system comprising the concentrating inlet apparatus of FIG. 1 according to various embodiments described herein.

FIG. 2 illustrates a schematic diagram of an example system 10 comprising the concentrating inlet apparatus 100 of FIG. 1. As shown in FIG. 2, the concentrating inlet apparatus 100 can be configured and used in a system 10. Among possibly other components, the system includes the concentrating inlet apparatus 100, the air sample 116, the vacuum pump 118, an inlet pump 120, a first flow controller 126, an analyte sensor 130, a second flow controller 128, a sampling pump 122, and a controller 132. The system 10 is provided as a representative example in FIG. 2. In other examples, one or more of the components shown can be omitted from the system 10 or other components not shown can be added.

The sample stream inside the tube 102 can be maintained at a sample pressure using the inlet pump 120, the sampling pump 122, or both the inlet pump 120 and the sampling pump 122 in some cases, depending on the specified pressure conditions. For example, the sampling pump 122 can draw the sample stream through the tube 102 of the concentrating inlet apparatus 100. The sampling pump 122 can be fluidly connected to the outlet port 112 of the inlet apparatus 100. The sampling pump 122 can be configured to provide an ambient pressure sample flow in one case, although the sampling pump 122 can provide other sample flow pressures. In another example, the inlet pump 120 can be used for high pressure conditions. The inlet pump 120 can be a pump fluidly connected to the chamber 108 of the inlet apparatus prior to the inlet 104 in the line of flow of the sample stream. The inlet pump 120 can be configured to compress the sample stream to provide a high-pressure sample flow. In some examples, the inlet pump 120 can be replaced with a pressure regulator to control the flow from a pressurized air sample 116.

The pressure of the chamber 108 can be regulated by the vacuum pump 118. The pressure differential (Δp) between the sample stream within the tube 102 and within the chamber 108, allows the inert gases to pass or permeate out from within the tube 102 and into the chamber 108. In some examples, a combination of pressurized and vacuum systems can be used to form the pressure differential (Δp).

In some examples, the system 10 can include a controller 132. The controller 132 can include a microprocessor and memory and be configured to control one or more of the pumps 118, 120, and 122, the flow rates of the sample stream via the flow controllers 126, 128, and/or monitor the analyte sensor 130. The system 10 can also comprise valves, connectors, fittings, ferrules, ports and the like not shown in the schematic diagram of FIG. 2. In some examples, the system 10 can include a bypass conduit to direct flow around the concentrating inlet apparatus 100 (not shown).

The volumetric flow rate (Q) of the sample stream can be set or measured by the flow controller 126 and 128. The flow controller 126 can be positioned in-line before the inlet port 104 of the apparatus 100 and/or flow controller 128 can be positioned in-line after the outlet port 112. The flow controllers 126, 128 can facilitate monitoring leaks present in the system. The inlet pump 120, the sampling pump 122, or both can be configured to pump a sample stream of air at a specified flow rate. The analyte sensor 130 is positioned in-line, downstream in the direction of the sample stream flow, after the outlet port of the apparatus 100. For example, the analyte sensor 130 can be a flame ionization detector (FID) or other sensor to measure the components of interest.

Figure 3:
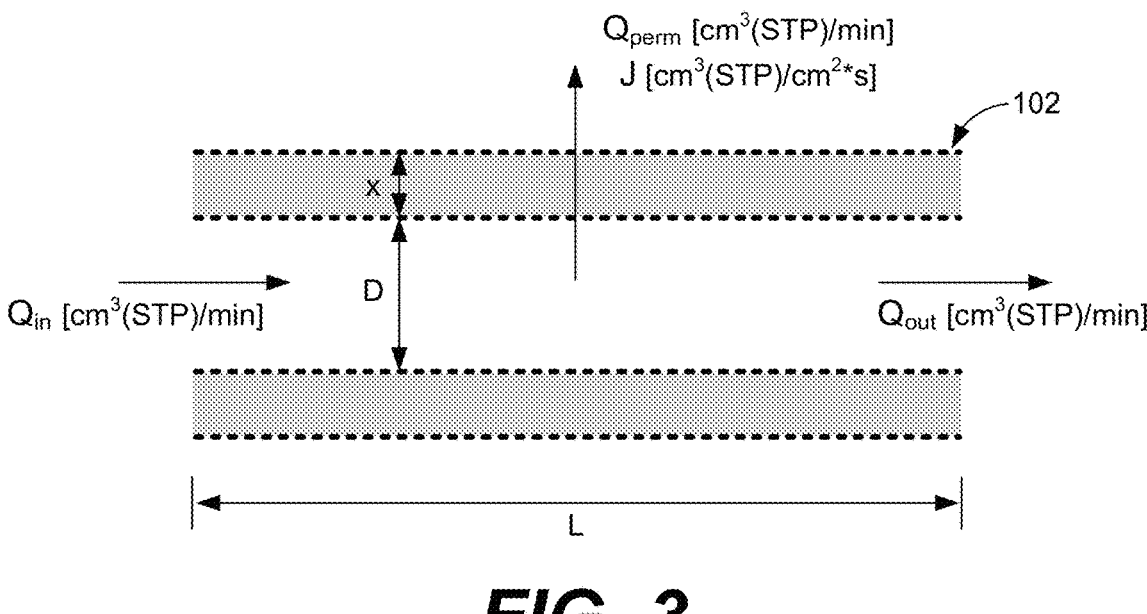
FIG. 3 illustrates an example of sample flow through a length of tube of the apparatus of FIG. 1 according to various embodiments described herein.

In FIG. 3, an example diagram of a cross section portion of the selectively permeable tube 102 is shown. The tube 102 of the concentrating inlet apparatus 100 can have a selected length (L), inner diameter (D), and thickness (x) for a selected semi-permeable material. For most semi-permeable materials, at least some compound-specific permeability data is available from the material manufacturer. For example, P is a permeability coefficient of a gaseous species. More broadly, one can measure permeability for a given compound for a given material by subjecting a membrane of the material with known dimensions to a pressure differential and measuring the rate at which the compound crosses the membrane. Here, the membrane is selectively permeable material of the tube 102.

The steady state flux of the gas, or component of interest, through a permeable membrane is given by equation (1):

$$J_i = P_i \times \frac{p_{upstream} - p_{downstream}}{x} = P_i \times \frac{\Delta p}{x} \tag{1}$$

where $J_i$ is the steady state gas flux of some component, i, of the gas (typically in $cm^3$ (STP) $cm^{-2}$ $s^{-1}$), $p_{upstream}$ and $p_{downstream}$ are the upstream and downstream pressures respectively in cmHg (or $\Delta p$ is the pressure difference across the wall of the permeable membrane), x is the thickness of the permeable membrane in cm, and P is the permeability coefficient of the gaseous species.

The permeability coefficient of the gaseous species (P) is commonly expressed in terms of the non-SI unit Barrer which is equal to $10^{-10}$ $cm^3$ (STP) cm $cm^{-2}$ $s^{-1}$ $cmHg^{-1}$ or $3.35 \times 10^{-11}$ mol m $m^{-2}$ $s^{-1}$ $bar^{-1}$. The gas flux (J) can be expressed in terms of flow rate using Equation (2), where $Q_{perm,i}$ is the volumetric flow rate at standard temperature and pressure, typically in $cm^3$ (STP) $min^{-1}$, or standard cubic centimeters per minute, sccm. The surface area (A) of the permeable member can be expressed in terms of $cm^2$.

$$Q_{perm,i} = J_i \times A \tag{2}$$

The permeability of the tube 102 is exploited with the purpose of enriching a sample flow of ambient with higher concentrations of trace gases of interest. Air or another stream of gasses is sampled through the tube 102, which is comprised of a permeable membrane subjected to a pressure differential. In the examples shown herein, sample flow through the tube 102 is maintained at a higher pressure, allowing permeation of gases out of the sample, as shown in FIG. 3. Under these conditions, the surface area A in Equation (2) is given by $\pi D L$ where D and L are the inner diameter and length of tubing respectively.

For example, Teflon™ AF-2400 can be used for the tube 102, which is a commercially available amorphous glassy copolymer of tetrafluoroethylene (TFE) and 2,2-bis(trifluoromethyl)-4,5-difluoro-1,3-dioxole (BDD). The gas permeability through Teflon™ AF-2400 follows a size-sieving trend where permeability decreases with increase in critical volume of the gaseous species transporting across the membrane. In principle, the approach can be applied to other permeable materials, provided selective permeable between analytes of interest and air.

On combining equations (1) and (2) and accounting for the unit conversions, Equation (3):

$$Q_{perm,i}[sccm] = \tag{3}$$

$$60\left[\frac{s}{min}\right] \times 75\left[\frac{cmHg}{bar}\right] \times 10^{-10} \times P_i[\text{Barrer}] \times \frac{\Delta p[bar] \times A[cm^2]}{x[cm]}$$

The standard volumetric permeation rate can be understood as a mass or molar flow as in equation (4):

$$Q_{perm,i}\left[\frac{moles}{min}\right] = \tag{4}$$

$$60\left[\frac{s}{min}\right] \times 3.35 \times 10^{-11} \times P_i[\text{Barrer}] \times \frac{\Delta p[bar] \times A[m^2]}{x[m]} =$$

$$\frac{0.335 \times Q_{perm,i}[sccm]}{100\left[\frac{cm}{m}\right] \times 75\left[\frac{cmHg}{bar}\right]}$$

In some cases, the volumetric flow rate leaving the inlet as the sample flow ($Q_{out}$ in FIG. 3) is a preset condition, set by the sampling instrument. In this case, flow into the inlet is the sum of permeation flow and set to the outlet, as in Equation (5) as:

$$Q_{in,i} = Q_{perm,i} + Q_{out,i} \tag{5}$$

As the goal is to sample trace gases in a sample flow dominated by air, a given total flow, $Q_{j,tot}$ is considered the sum of the combined flow rates of air and any other components of the gas (e.g., an analyte of interest), and for dilute gases in a predominantly air sample flow is approximately equal to the air flow rate:

$$Q_{j,tot} = Q_{j,air} + Q_{j,analyte} + \ldots \approx Q_{j,air} \tag{6}$$

Each analyte in each flow, j, exists with some concentration, C, measured as its mixing ratio (moles of analyte per mole of air):

$$C_{j,analyte} = \frac{Q_{j,analyte}}{Q_{j,air}} \tag{7}$$

Each analyte will have a permeability across the membrane according to their critical volume, temperature, interactions with the tubing polymer, and membrane pressure differential. In the case of an analyte that has lower permeability than air, relatively more air will cross the membrane, and the amount of analyte in $Q_{out}$ will be enhanced relative to the remaining air. This enhancement can be quantified as the excess concentration analyte in the outlet flow relative to the inlet flow (see Equation (8)). The maximum possible concentration enhancement occurs for any analyte that has no permeability across the membrane. In such a case, no analyte is lost by permeation and $Q_{in,analyte}$ is equal to $Q_{out,analyte}$. Enhancement at this extreme condition of no analyte permeability is given as:

$$\text{Maximum enhancement} = \tag{8}$$

$$\frac{C_{out,analyte}}{C_{in,analyte}} - 1 = \frac{\dfrac{Q_{out,analyte}}{Q_{out,air}}}{\dfrac{Q_{in,analyte}}{Q_{in,air}}} - 1 = \frac{\dfrac{Q_{in,analyte}}{Q_{out,air}}}{\dfrac{Q_{in,analyte}}{Q_{in,air}}} - 1 = \frac{Q_{in,air}}{Q_{out,air}} - 1$$

From Equation (8), enhancement is determined by the amount of air that permeates across the membrane, and all analyte mass within the permeated flow remains in the minor outlet flow. By including the subtraction of 1 in (8), enhancement quantifies the excess mass that was concentrated into the outlet flow as an enrichment. The maximum enhancement is controlled by the ratio of how much air enters the inlet versus how much flows to the sensor.

In reality, no analytes have a permeability of zero, and all analyte gases can permeate across the membrane to some degree. The degree to which one component crosses the membrane relative to another (the "selectivity") is a function of the ratio of permeabilities. The selectivity of interest in this work is that of the analyte (which ideally remains in the sample flow) relative to air (which is removed across the membrane), $P_{analyte}/P_{air}$. At the extreme condition of no selectivity, where analyte permeability approaching that of nitrogen and/or oxygen, the composition of the permeation flow is identical to that of the sample flow and no enhancement is possible. At intermediate selectivity, $Q_{perm}$ is depleted in analyte relative to the sample, with remaining analyte mass concentrated into the sample flow. A general form describes extreme and intermediate cases, in which enhancement of an analyte is reduced from maximum enhancement as a function of the selectivity:

$$\text{Enhancement [\%]} = \left( \frac{Q_{in,air}}{Q_{out,air}} - 1 \right) \times \left( 1 - \frac{P_{analyte}}{P_{air}} \right) \times 100 \tag{9}$$

Total enhancement can therefore be calculated by combining Equations (3), (5), and (9) as:

$$\text{Enhancement [\%]} = (P_{air} - P_{analyte}) \times \tag{10}$$

$$\frac{\Delta p[\text{bar}]}{Q_{out,air}[sccm]} \times \frac{A[\text{cm}^2]}{x[\text{cm}]} \times 60 \left[ \frac{\text{s}}{\text{min}} \right] \times 75 \left[ \frac{\text{cmHg}}{\text{bar}} \right] \times 10^{-10} \times 100$$

In Equation (10), the first term represents the selectivity of the analyte and membrane material, the second term represents system operating conditions, the third term represents physical parameters of the tubing membrane, and the remaining terms represent unit conversions and constants.

For example, when the selectively permeable material is Teflon™ AF-2400, it is noted that permeabilities of most analytes of interest are an order of magnitude lower than that of air. Permeabilities of mixed gases typically diverge from pure gas permeabilities or ideal mixing, so it is generally expected that a precise permeability will not be known for each analyte in the complex atmospheric mixture. However, most analytes in the atmosphere are sufficiently large to maximize selectivity in the material used and are shown to approach maximum enhancement, so a precise accounting of permeability is not necessary.

The following section describes the experimental method used to quantify the extent of enhancement for selected compounds of interest. In subsequent discussion, $Q_{out}$ is referred to as Q for simplicity, as this is the flow that is actually sampled by the downstream detectors.

Figure 4:
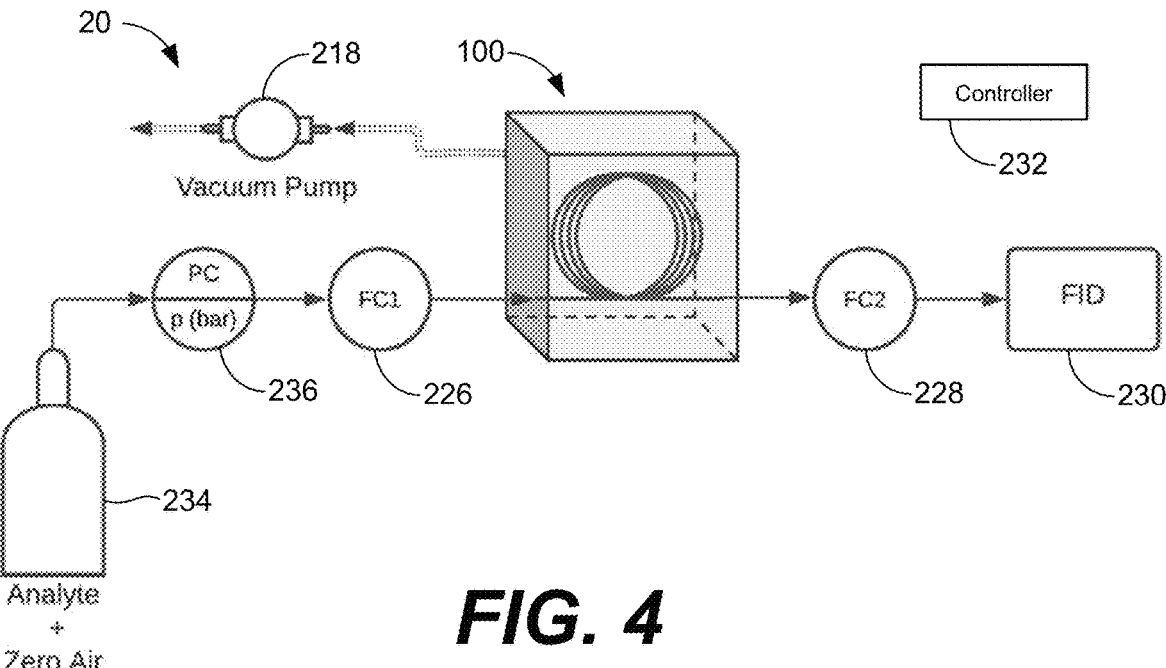
FIG. 4 illustrates an example experimental system setup of the concentrating inlet apparatus of FIG. 1 according to various embodiments described herein.

In FIG. 4, similar to system 10, system 20 provides an experimental setup to evaluate the performance of the concentrating inlet 100. Instead of pumps, shown in system 10, pressurized gas cylinders 234 can be used to deliver the sample to the concentrating inlet apparatus 100 through a pressure regulator 236. A mass flow controller 226 was positioned upstream, before the concentrating inlet apparatus 100 and a mass flow controller can be positioned downstream after the outlet of the concentrating inlet apparatus 100 to measure and control flows in the system. For example, the pressure regulator can be a pneumatic regulator such as a Wilkerson R00-01-000, and the like. For example, the flow controllers can be gas mass flow controllers such as Alicat Scientific MCS-10 sccm, and the like. The controller 232 can be a comprise a microprocessor and memory configured to control one or more pumps 218, the flow rates of the sample stream via flow controllers 226, 228 and/or the pressure controller 236, and/or monitor the analyte sensor 130. The system 20 can also comprise valves, connectors, and ports not shown in the schematic diagram of FIG. 4. In some examples, the system 20 can include a bypass conduit to direct flow around the concentrating inlet 100 (not shown).

As described above, the permeation rate depends on a specified material for the tube 102 and its parameters: thickness and internal surface area. For a selected semi-permeable material and thickness (x) of tube, the permeation rate can be proportional to the length (L) of the of tube 102, which with the internal diameter (D) determines the internal surface area (A). In some examples, employing longer tubing can result in higher enrichment. In some examples, using more than one tube in parallel to increase the combined internal surface area of tubing can result in higher enrichment. For example, the tube 102 can be a group or plurality of individual tubes configured to receive the sample stream in parallel.

The permeation rate shown in equation 11.

$$\text{Permeation rate} \propto \tag{11}$$

$$\frac{\text{Permeability} \times \text{pressure differential} \times \text{internal surface area}}{\text{wall thickness}}$$

In an example, Teflon™ AF-2400 tubing was used to for tube 102, having an internal diameter of 0.61 mm, a wall thickness of 0.064 mm, and a length of 320 cm. Based on these parameters and an average $P_{air}$=600 Barrer as reported for this material, Equation 10 can be reduced:

$$\text{Enhancement [\%]} = 0.6908 \times \Delta p \times \left( 1 - \frac{P_{analyte}}{P_{air}} \right) \frac{L}{Q} \tag{12}$$

Figure 5:
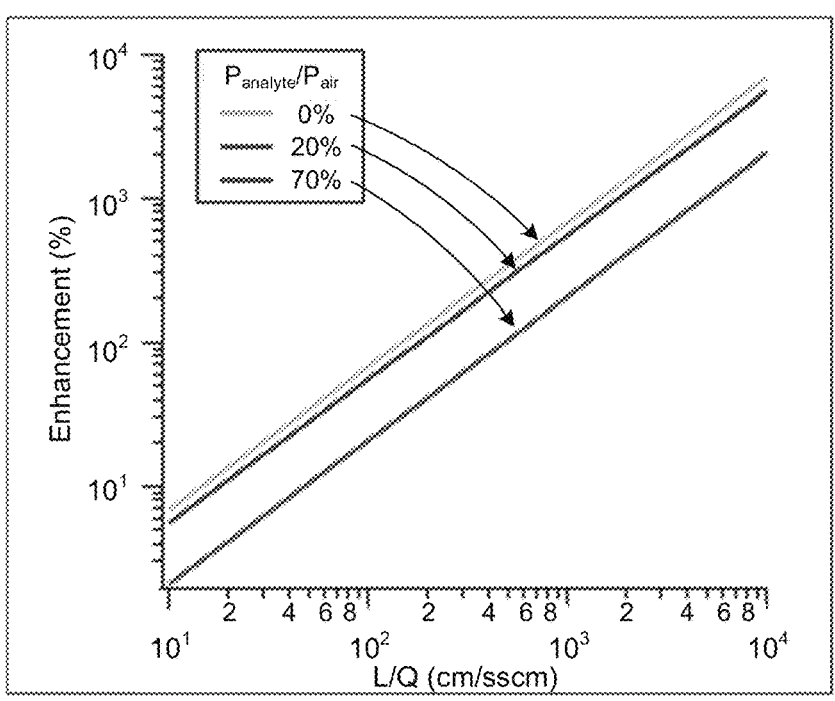
FIG. 5 illustrates enhancement percentage over L/Q for various percentages of analyte in the air sample according to various embodiments described herein.
Figure 6:
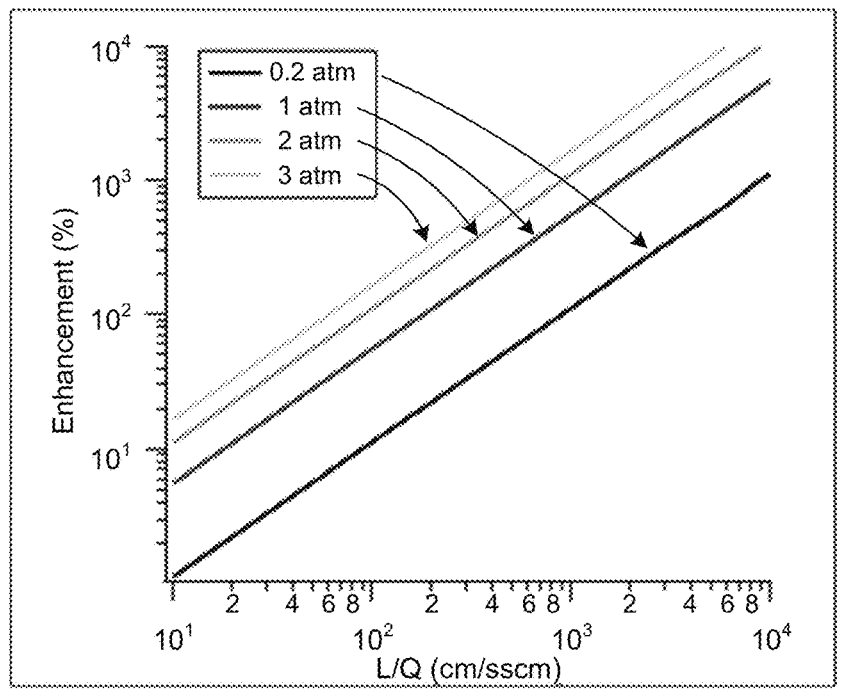
FIG. 6 illustrates enhancement percentage over L/Q for various percentages of pressure differentials according to various embodiments described herein.

As shown in FIGS. 5 and 6, the enhancement percentage increases proportionally to the length to volume flow rate ratio (L/Q). FIG. 5 shows the enhancement percentage over L/Q in the air sample for various analyte selectivity, quantified as the ratio of permeability of analyte to that of air $$\left( \frac{P_{analyte}}{P_{air}} \right).$$

For example, cases are shown in which the analyte permeability is 0%, 20%, and 70% of the permeability of air. FIG. 6 shows the enhancement percentage over L/Q for various pressure differentials are shown. For example, the higher pressure differential of 3 atm shows a greater enhancement than a pressure differential of 0.2 atm.

Figure 7:
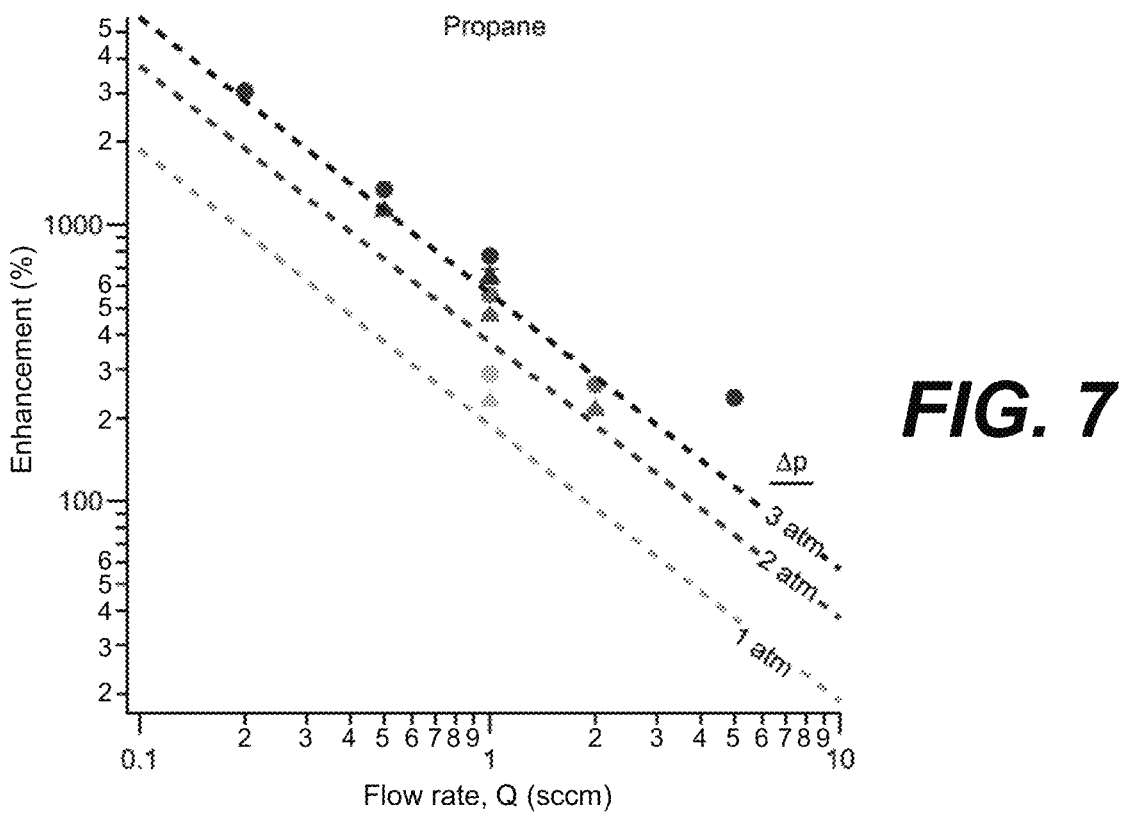
FIG. 7 illustrates enhancement percentage at different pressure differentials for varying flow rates according to various embodiments described herein.
Figure 8:
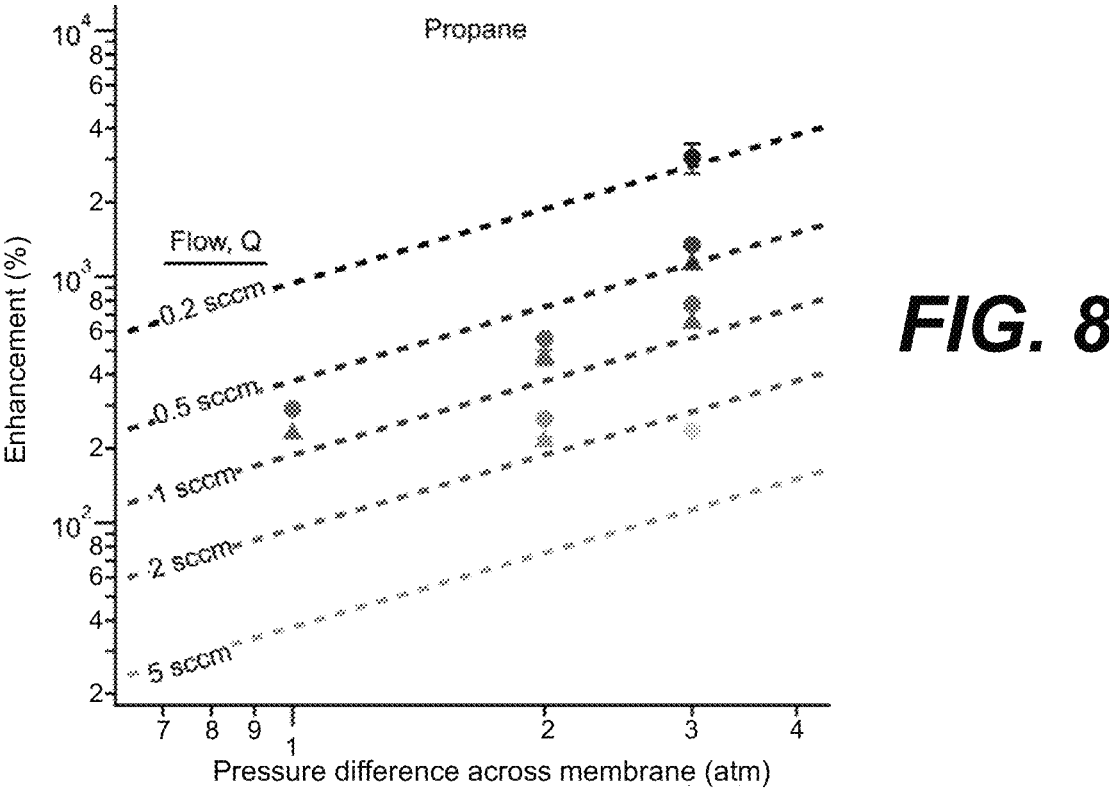
FIG. 8 illustrates enhancement percentage at different flow rates for varying pressure differentials according to various embodiments described herein.

Shown in FIGS. 7 and 8, the enhancement percentage are shown as volumetric flow and pressure vary for propane as the analyte of interest. The triangles represent high pressure (HP) conditions, meaning the pressure differential was achieved by pressurizing the sample flow and leaving the low-pressure side of the tube 102 within the chamber 108 as ambient. The circles represent sub-ambient (SA) conditions, meaning the low-pressure side of the tube 102 within the chamber 108 was held at vacuum (0.2 bar) and the sample flow was pressurized as necessary to achieve the selected total pressure differential (Δp). FIG. 7 shows the enhancement percentage as flow rate (Q) varies for pressure differentials at 1 atm, 2 atm, and 3 atm. FIG. 8 shows the enhancement percentage for varying pressure differences for various flow rate (Q). Flow rates at 0.2 sccm, 0.5 sccm, 1 sccm, 2 sccm, and 5 sccm are shown.

In another example, different analytes (methane, propane, butane, pentane, cyclohexane, α-pinene, and isoprene) were tested using system 20, as shown in FIG. 4. In this test, the material of tube 102 was Teflon™ AF-2400, which had an internal diameter of 0.61 mm, wall thickness of 0.064 mm, and length of 320 cm. The samples 234 included portable calibration gas cylinders were used for methane (1% Methane Balance Air Certified Standard Mixture, Airgas®), propane (0.6% Propane Balance Air Certified Standard Mixture, Airgas®), and butane (0.9% N Butane Balance Air Certified Standard Mixture, Airgas®). Samples for isoprene, α-pinene, cyclohexane, and n-pentane were prepared in a 6 litre TO-Can Air Sampling Canisters (Restek, Bellefonte, PA). Ultra Zero Grade Air (Airgas®) was used as a make-up gas in the canisters to achieve a desired pressure.

The pressure downstream of the cylinder or canister 234 was controlled using a pressure regulator 236. Two mass flow controllers 226, 228 were used to measure and control flows in the system 20. Flow controller 228 operated in the range of 0-10 sccm and was used to set the desired inlet delivery flow rate. Flow controller 226 was used to monitor if any leaks were present in the system. PEEK fittings and ferrules were used to adapt the thin tube 102 to the mass flow controllers 226, 228. In this example, the analyte sensor 230 was an FID and the FID signal was logged using a controller 232, where the readings were averaged every second as they were being recorded. In this example, the analyte sensor 230 was an SRI Instruments Flame Ionization Detector and the controller was an Arduino Uno R3, although the system can be implemented and relied upon in other types and configurations.

The concentrating inlet 100 included the tube 102 rested in a container 108 that was either open to the atmosphere, for high pressure testing conditions, or closed and connected to a vacuum pump for sub-atmospheric testing conditions. Prior to each experiment, the response of the FID was measured as a function of flow rates. To keep any losses to instrument lines constant, only the concentrating inlet apparatus 100 was removed. Flow controller 228 was used to control the flow delivered to the FID and the response was recorded. Since the FID response was not linear, a quadratic function was used to obtain an equation relating the FID response and delivery flow rate. The $R^2$ value of all calibration curves were above 0.98.

Figure 9:
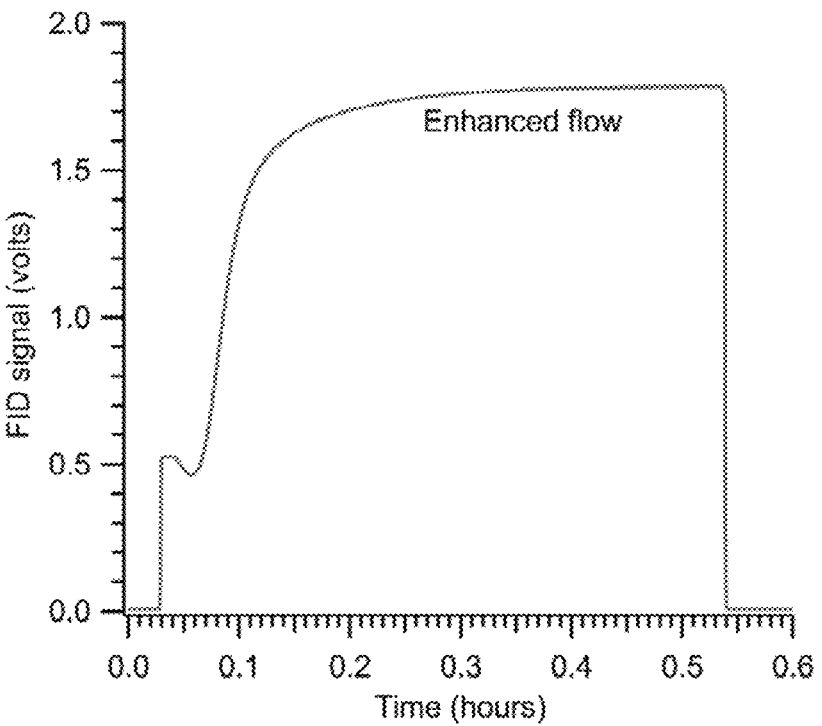
FIG. 9 illustrates analyte detection over time according to various embodiments described herein.

A series of experiments were conducted to study the extent of enhancement for each set of operating conditions. Prior to each run, the sample delivery pressure was set using pressure controller 236. This setting was not altered for calibration runs. Next, the sample flow rate was set on flow controller 228 and the valve on the cylinder containing the sample was opened. The runs were stopped when the readings were deemed to have reached stability upon visual inspection. For example, as shown in FIG. 9 for cyclohexane at a pressure differential of 2 bar and sample flow rate of 2 sccm, one of the runs was stopped at roughly the 0.54 hour mark. The tube 102 was disconnected after each run and any remaining sample in the tube 102 was removed using a pump (not shown). Apart from quantifying the extent of enhancement due to the inlet, the effect of several operating conditions (namely, delivery flow rate of enhanced stream (Q) and pressure difference across the membrane driving permeation across it (Δp)) on the enhancement were also studied.

The pressure downstream of the permeable membrane affects the permeation rate. Lower analyte permeation rates through the membrane were noted when the downstream pressure is close to vacuum (sub-atmospheric operation) which implies that a higher enhancement of sample flow could be expected in our system. Conversely, higher rates of analyte permeation were measured when the downstream pressure is 1 atm (high pressure operation) which could yield lower enhancement of sample flows in our system. To accommodate these differences, the pressure differential was applied in two ways: (1) high pressure (HP) operating condition where the sample flow inside the enhancing tubing was maintained at a high pressure and the outside of the tubing at ambient pressures, and (2) sub-atmospheric (SA) operating condition where the sample flow inside the enhancing tubing was maintained at high or ambient pressures and the outside of the tubing at vacuum pressures.

Figure 10:
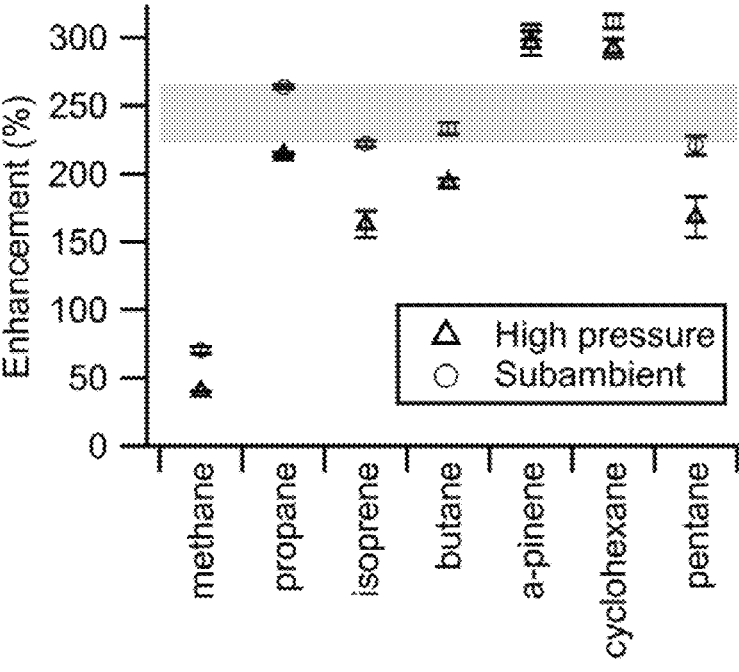
FIG. 10 illustrates enhancement percentages detected for various analytes according to various embodiments described herein.

Furthermore, enhancement was studied using different analytes study the influence of the permeability of the analyte molecule on sample enhancement. The concentrating inlet apparatus 100 was configured the material of tube 102 was Teflon™ AF-2400, which had an internal diameter of 0.61 mm, wall thickness of 0.064 mm, and length of 320 cm. FIG. 10 shows enhancement percentages detected for methane, propane, butane, pentane, cyclohexane, α-pinene, and isoprene with Δp=2 bar and the sample flow rate at 2 sccm. A list of all conditions studied is presented in Table 1 below. Each condition was tested in triplicates except propane at 3 bar pressure differential (HP) at a sample flow rate of 0.5 and 1 sccm. HP conditions were not tested at 3 bar pressure differential for cyclohexane due to the maximum pressure limitations of the TO-Can sampling canister.

The FID readings were available at 1-second resolution. The FID reading for enhanced sample flow was calculated as the average of FID readings over one minute before the run was stopped. The calibration chart prepared for the run was used to determine the concentration in the flow out of the inlet to the FID. The overall enhancement was obtained by comparing it to the concentration in the sample flow entering the inlet.

The average and standard deviation of enhancement over triplicate measurements was calculated for each set of operating conditions and is reported in Table 1.

TABLE 1

| Analyte | Flow (Q sccm) | Total pressure differential applied (dP bar) | Operating condition | Enhancement (%) Sub-atmospheric (SA) | High Pressure (HP) |
|---|---|---|---|---|---|
| methane | 2 | 2 | SA, HP | 70.39 ± 2.61 | 40.07 ± 0.45 |
| butane | 2 | 2 | SA, HP | 233.11 ± 4.09 | 193.62 ± 3.18 |
| pentane | 2 | 2 | SA, HP | 221.07 ± 6.89 | 168.29 ± 14.76 |
| α-pinene | 2 | 2 | SA, HP | 304.48 ± 5.55 | 296.08 ± 9.12 |
| isoprene | 2 | 2 | SA, HP | 222.26 ± 2.32 | 163.18 ± 9.87 |
| cyclohexane | 0.2 | 3 | SA | 4635.30 ± 413.49 | |
| | 0.5 | 3 | SA | 1869.92 ± 12.03 | |
| | 1 | 2 | SA, HP | 750.93 ± 11.55 | 695.40 ± 31.24 |
| | 1 | 3 | SA | 1050.40 ± 23.03 | |
| | 2 | 2 | SA, HP | 114.86 ± 0.76 | 110.55 ± 3.73 |
| | 3 | 1 | SA, HP | 312.21 ± 4.61 | 292.39 ± 6.69 |
| | 5 | 3 | SA | 187.26 ± 2.72 | |
| propane | 0.2 | 3 | SA | 3047.38 ± 56.06 | |
| | 0.5 | 3 | SA, HP | 1343.26 ± 3.27 | 1122.98 ± 7.71 |
| | 1 | 1 | SA, HP | 289.79 ± 1.04 | 229.57 ± 1.21 |
| | 1 | 2 | SA, HP | 558.67 ± 0.54 | 469.59 ± 7.63 |
| | 1 | 3 | SA, HP | 772.64 ± 3.11 | 651.33 ± 39.44 |
| | 2 | 2 | SA, HP | 263.88 ± 1.25 | 214.05 ± 1.11 |
| | 5 | 3 | SA | 236.52 ± 0.29 | |

Average enhancement offered by a 320 cm length of tube in a concentrating inlet for all compounds at all operating conditions.

The concentrating inlet apparatus 100 disclosed herein can be attached to the front-end of any measurement system and is inert, thus is ideal to enhance any measurements of reactive trace gases.

Figure 11:
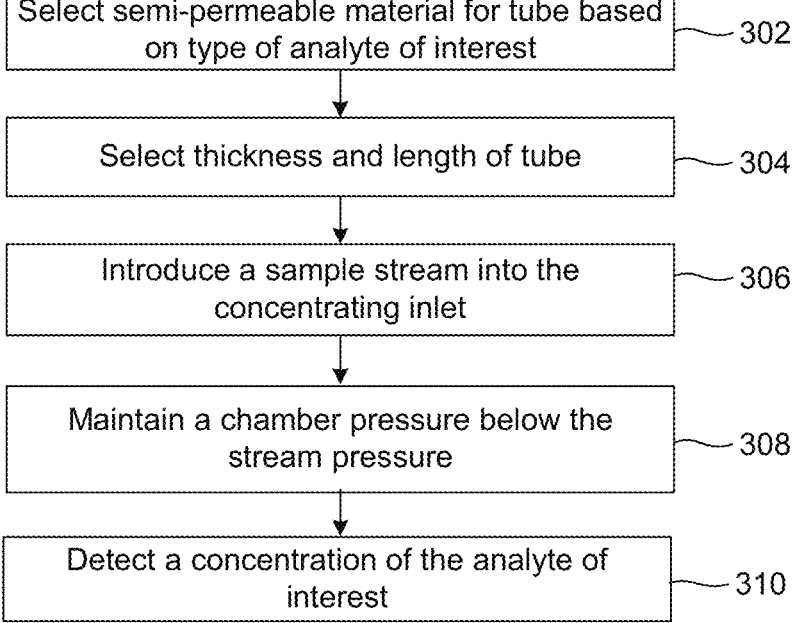
FIG. 11 illustrates an example method for enriching the concentration of trace components in an air flow according to various embodiments described herein.

A method for enriching a concentration of trace components in an air flow is shown in FIG. 11. At box 302, the process can include selecting a semi-permeable material for the tube 102 for the concentrating inlet apparatus 100. The material for the tube 102 can be chosen based on the type of analyte of interest. The semi-permeable material can be a selectively permeable material configured to allow inert gases to pass through the selectively permeable material. For most semi-permeable materials, at least some compound-specific permeability data is available from the material manufacturer. For example, a semi-permeable material can be a glassy polymer, such as a polytetrafluoroethylene (PTFE), tetrafluoroethylene (TFE), polysulfone (PSU), polyethersulfone (PES) and polyphenylene sulfone (PPSU), polyetherimide (PEI), or polyether ether ketone (PEEK). For example, is Teflon™ AF-2400 is a PTFE. The selected semi-permeable material having a lower permeability to components of interest than to inert gases, and the selectively permeable material being non-reactive with components of interest.

At box 304, the process can include selecting the thickness and length of the tube 102 to affect the level of concentration or enhancement percentage. For example, increasing the length of the tube 102 can increase the internal surface area for the flow pathway through which the sample stream passes, increasing the permeation rate of inert gases. The surface area can also be increased by using a plurality of tubes at specified lengths providing a plurality of flow pathways. The inlet apparatus 100 can comprise the selected tube 102 and a chamber 108 comprising an inlet port 104 and an outlet port 112. The tube 102 made of a selectively permeable material, having a selected length and a diameter, can have a first end of the tube connected to the inlet port of the chamber and a second end of the tube connected to the outlet port of the chamber.

At box 306, the process can include introducing a sample stream of air into the concentrating inlet apparatus 100. For example, the sample stream can be introduced at a pressure within the tube 102 ($p_{stream}$) and the chamber 108 ($p_{chamber}$). A pressure differential can be applied by lowering the pressure of the chamber or raising the pressure of the sample stream.

At box 308, the process can include maintaining a chamber pressure that is different than a stream pressure of the sample stream. The chamber pressure can be less than the stream pressure of the sample stream. The chamber 108 can be subjected to a vacuum outside the tube 102, and the sampling stream inside the tube 102 can be pressurized, or a combination of both. For example, the concentrating inlet apparatus 100 can be open to the atmosphere, for high pressure testing conditions, where the sample stream is introduced at a high pressure. In another example, the concentrating inlet apparatus 100 can be closed and connected to a vacuum pump for sub-atmospheric testing conditions.

At box 310, the process includes detecting a concentration of the components of interest using an analyte sensor. For example, a flame ionization detector, photoionization detector, electrochemical sensor, metal oxide sensor, or other analyte sensor can be used to detect analytes such as methane, propane, butane, pentane, cyclohexane, α-pinene, and isoprene.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

The invention claimed is:

1. An apparatus for enriching a concentration of components of interest in an air flow, the apparatus comprising:
   a chamber comprising an inlet port and an outlet port; and
   a tube being a single walled tube having a tube wall made of a selectively permeable material positioned within the chamber, the tube having a length, a first end of the tube connected to the inlet port of the chamber, a second end of the tube connected to the outlet port of the chamber, the selectively permeable material having a lower permeability to components of interest than to inert gases, and the selectively permeable material being non-reactive with the components of interest,
   wherein the apparatus is configured to receive a sample stream into the tube via the inlet port and the chamber is maintained at a chamber pressure that is different than a stream pressure of the sample stream such that the inert gases permeate out of the sample stream into the chamber and the components of interest are concentrated in the sample stream.

2. The apparatus of claim 1, wherein the chamber pressure is less than the stream pressure of the sample stream.

3. The apparatus of claim 1, wherein the chamber is subjected to a vacuum outside the tube to set the chamber pressure, the sampling stream inside the tube is pressurized to set the stream pressure, or a combination of both.

4. The apparatus of claim 1, wherein the selectively permeable material is configured to allow the inert gases to pass through the selectively permeable material.

5. The apparatus of claim 1, wherein the selectively permeable material comprises at least one of: polytetrafluoroethylene (PTFE), tetrafluoroethylene (TFE), polysulfone (PSU), polyethersulfone (PES) and polyphenylene sulfone (PPSU), polyetherimide (PEI), or polyether ether ketone (PEEK).

6. The apparatus of claim 1, wherein the tube has a wall thickness, and a permeation rate is inversely proportional to the wall thickness.

7. The apparatus of claim 1, wherein an outlet concentration of the components of interest in an outlet flow is greater than an inlet concentration of the components of interest in the sample stream received.

8. The apparatus of claim 1, wherein the tube comprises a plurality of tubes configured in parallel to receive the sample stream.

9. A system, comprising:
   a concentrating apparatus comprising:
   a chamber comprising an inlet port and an outlet port; and
   a tube being a single walled tube having a tube wall made of a selectively permeable material positioned within the chamber, the tube having a length, a first end of the tube connected to the inlet port of the chamber, a second end of the tube connected to the outlet port of the chamber, the selectively permeable material having a lower permeability to components of interest than to inert gases, and the selectively permeable material being non-reactive with the components of interest; and
   an analyte sensor configured to measure or detect the components of interest; and
   a pump configured to introduce a sample stream of air to the concentrating apparatus at a volumetric flow rate, wherein the concentrating apparatus is configured to receive the sample stream into the tube via the inlet port and the chamber is maintained at a chamber pressure that is different than a stream pressure of the sample stream such that the inert gases permeate out of the sample stream into the chamber and the components of interest are concentrated in the sample stream.

10. The system of claim 9, wherein the chamber is subjected to a vacuum outside the tube to set the chamber pressure, the sampling stream inside the tube is pressurized to set the stream pressure, or a combination of both.

11. The system of claim 9, wherein the pump is fluidly connected to the outlet port of the concentrating apparatus, and the pump is configured to provide an ambient pressure sample stream flow.

12. The system of claim 9, wherein the pump is fluidly connected to the inlet port of the concentrating apparatus, and the pump is configured to compress the sample stream to provide a high-pressure sample stream flow.

13. The system of claim 9, further comprising a vacuum pump fluidly connected to the chamber of the concentrating apparatus.

14. A method for enriching a concentration of trace components in an air flow, comprising:
   introducing a sample stream of air into a concentrating apparatus, the concentrating apparatus comprising:
   a chamber comprising an inlet port and an outlet port; and
   a tube being a single walled tube having a tube wall made of a selectively permeable material, the tube having a length and a diameter, a first end of the tube connected to the inlet port of the chamber and configured to receive the sample stream into the tube via the inlet port, a second end of the tube connected to the outlet port of the chamber, the selectively permeable material having a lower permeability to components of interest than to inert gases, and the selectively permeable material being non-reactive with the components of interest;
   maintaining a chamber pressure of the chamber to be different than a stream pressure of the sample stream in the tube such that the inert gases permeate out of the sample stream into the chamber and the components of interest are concentrated in the sample stream; and
   detecting a concentration of the components of interest.

15. The method of claim 14, wherein the chamber pressure is less than the stream pressure of the sample stream.

16. The method of claim 14, wherein the chamber is subjected to a vacuum outside the tube, the sampling stream inside the tube is pressurized, or a combination of both.

17. The method of claim 14, wherein the selectively permeable material is configured to allow the inert gases to pass through the selectively permeable material.

18. The method of claim 14, wherein the selectively permeable material for the tube is selected based on the components of interest.

19. The method of claim 14, wherein a thickness and the length of the tube are selected for a permeation rate.

20. The apparatus of claim 1, wherein the selectively permeable material comprises an amorphous glassy copolymer.

* * * * *